(12) United States Patent
Rocard et al.

(10) Patent No.: US 8,212,962 B2
(45) Date of Patent: Jul. 3, 2012

(54) OPTICAL DEVICE, MATERIAL FOR FORMING OPTICAL DEVICE, BACKLIGHT FOR DISPLAY, DISPLAY AND METHOD OF MAKING DEVICE OR MATERIAL

(75) Inventors: Florian Gilles Pierre Rocard, Oxford (GB); David James Montgomery, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 225 days.

(21) Appl. No.: 12/681,401

(22) PCT Filed: Oct. 7, 2008

(86) PCT No.: PCT/JP2008/068521
§ 371 (c)(1), (2), (4) Date: Jun. 24, 2010

(87) PCT Pub. No.: WO2009/048151
PCT Pub. Date: Apr. 16, 2009

(65) Prior Publication Data
US 2010/0289983 A1 Nov. 18, 2010

(30) Foreign Application Priority Data
Oct. 8, 2007 (GB) .................................. 0719595.1

(51) Int. Cl.
*G02F 1/1335* (2006.01)
(52) U.S. Cl. .......................................... 349/62; 349/66
(58) Field of Classification Search .................... 349/62, 349/66
See application file for complete search history.

(56) References Cited

U.S. PATENT DOCUMENTS

| | | | |
|---|---|---|---|
| 5,940,215 | A | 8/1999 | Rudisill et al. |
| 6,023,550 | A | 2/2000 | Benoit |
| 6,091,547 | A | 7/2000 | Gardiner et al. |
| 6,752,505 | B2 | 6/2004 | Parker et al. |
| 7,221,847 | B2 | 5/2007 | Gardiner et al. |
| 2003/0133285 | A1 | 7/2003 | Ludwig et al. |
| 2005/0024754 | A1 | 2/2005 | Epstein et al. |
| 2006/0077691 | A1 | 4/2006 | Kim et al. |
| 2007/0133094 | A1 | 6/2007 | Walton et al. |

FOREIGN PATENT DOCUMENTS

EP 0 881 427 A1 12/1998
(Continued)

OTHER PUBLICATIONS

International Search Report for corresponding Application No. PCT/JP2008/068521 mailed Jan. 13, 2009.
(Continued)

*Primary Examiner* — Phu Vu
(74) *Attorney, Agent, or Firm* — Renner, Otto, Boisselle & Sklar, LLP

(57) ABSTRACT

An optical device is provided, for example for use as a brightness enhancing film in a display. The device comprises a sheet (31) carrying a plurality of light-concentrating elements in the form of prism-like structures (171). The sheet (31) is non-flat, for example by being bent or curved, in one direction. Each of the prism-like structures (171) has first and second surfaces (34, 35) extending from the sheet (31) and intersecting at a line (33). A line (32) parallel to the viewing direction and passing through the intersection line (33) bisects the opposite surface (36) where it intersects (38) the film (31). When used in a display, such a device provides improved and uniform display brightness across a display of curved or other non-flat shape.

48 Claims, 16 Drawing Sheets

FOREIGN PATENT DOCUMENTS

| | | |
|---|---|---|
| GB | 2 443 849 | 5/2008 |
| JP | 10-339874 A | 12/1998 |
| JP | 2001-176315 A | 6/2001 |
| JP | 2004-288570 A | 10/2004 |

OTHER PUBLICATIONS

Form PCT/ISA/237 for corresponding Application No. PCT/JP2008/068521 dated Jan. 13, 2009.

Search Report for corresponding UK Application No. GB0719595.1 dated Feb. 5, 2008.

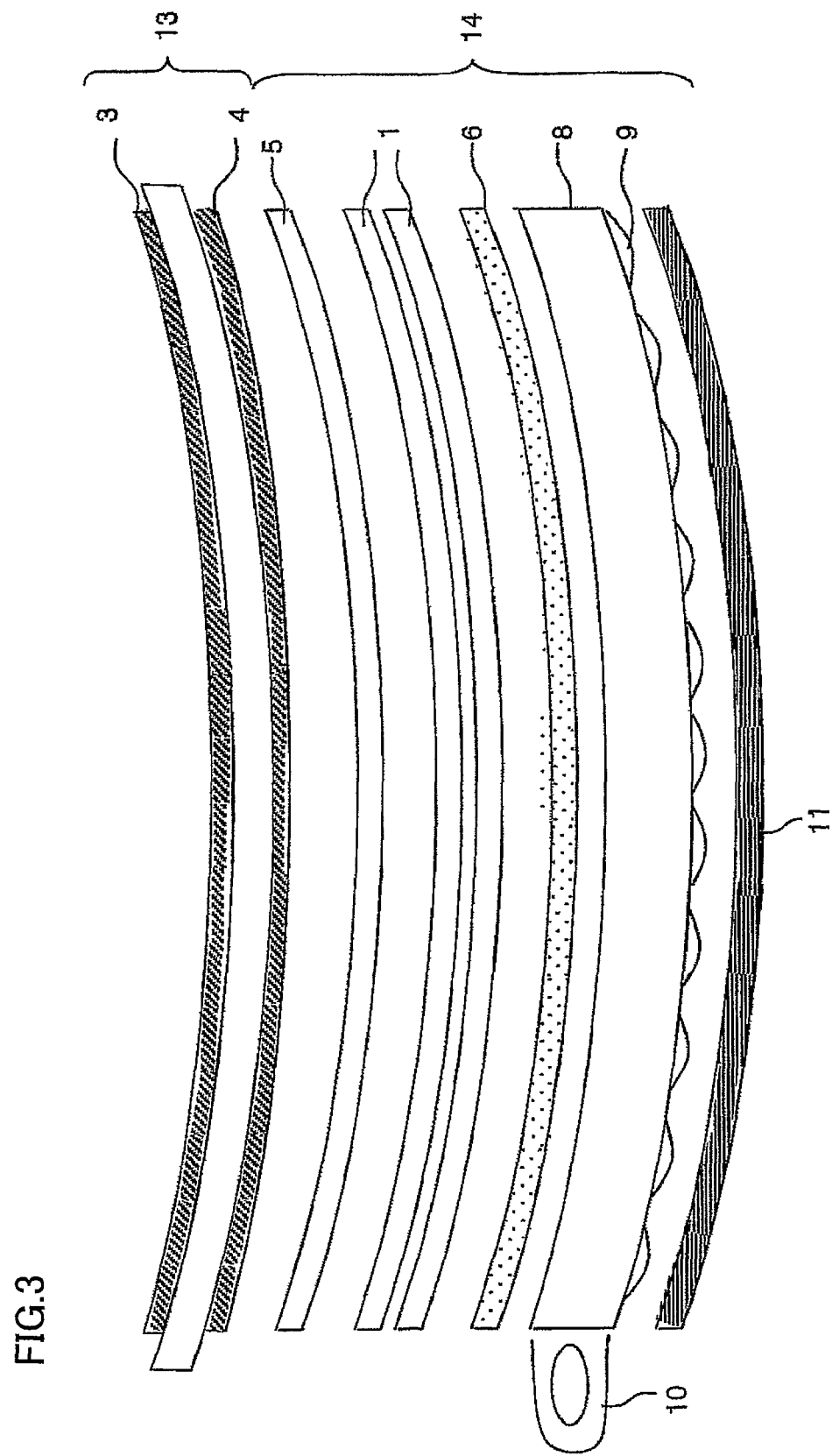

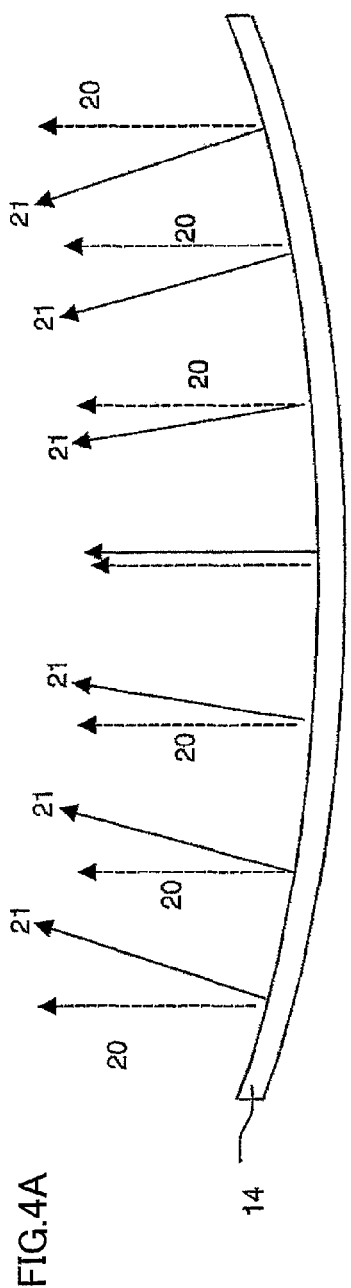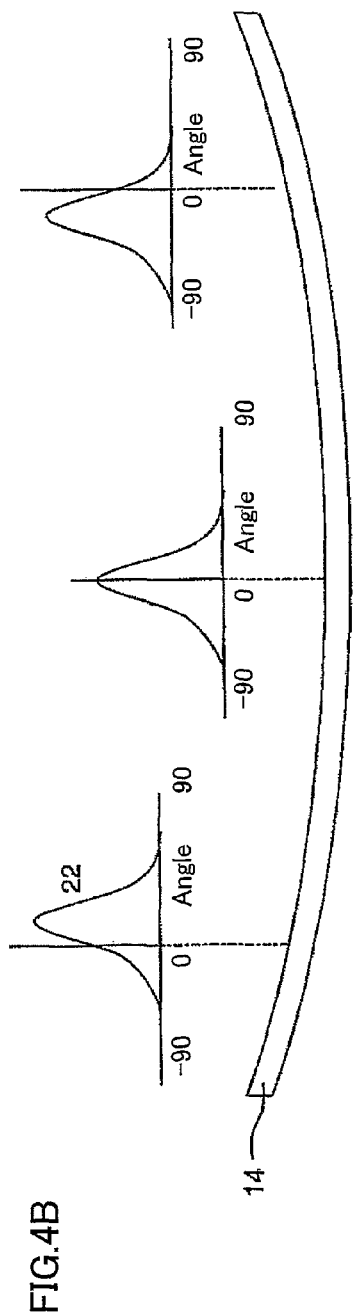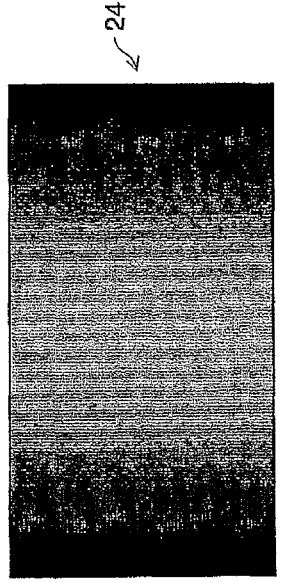
FIG.4A
FIG.4B
FIG.4C Apparent uniformity for a viewer place at the vertical of the curved display

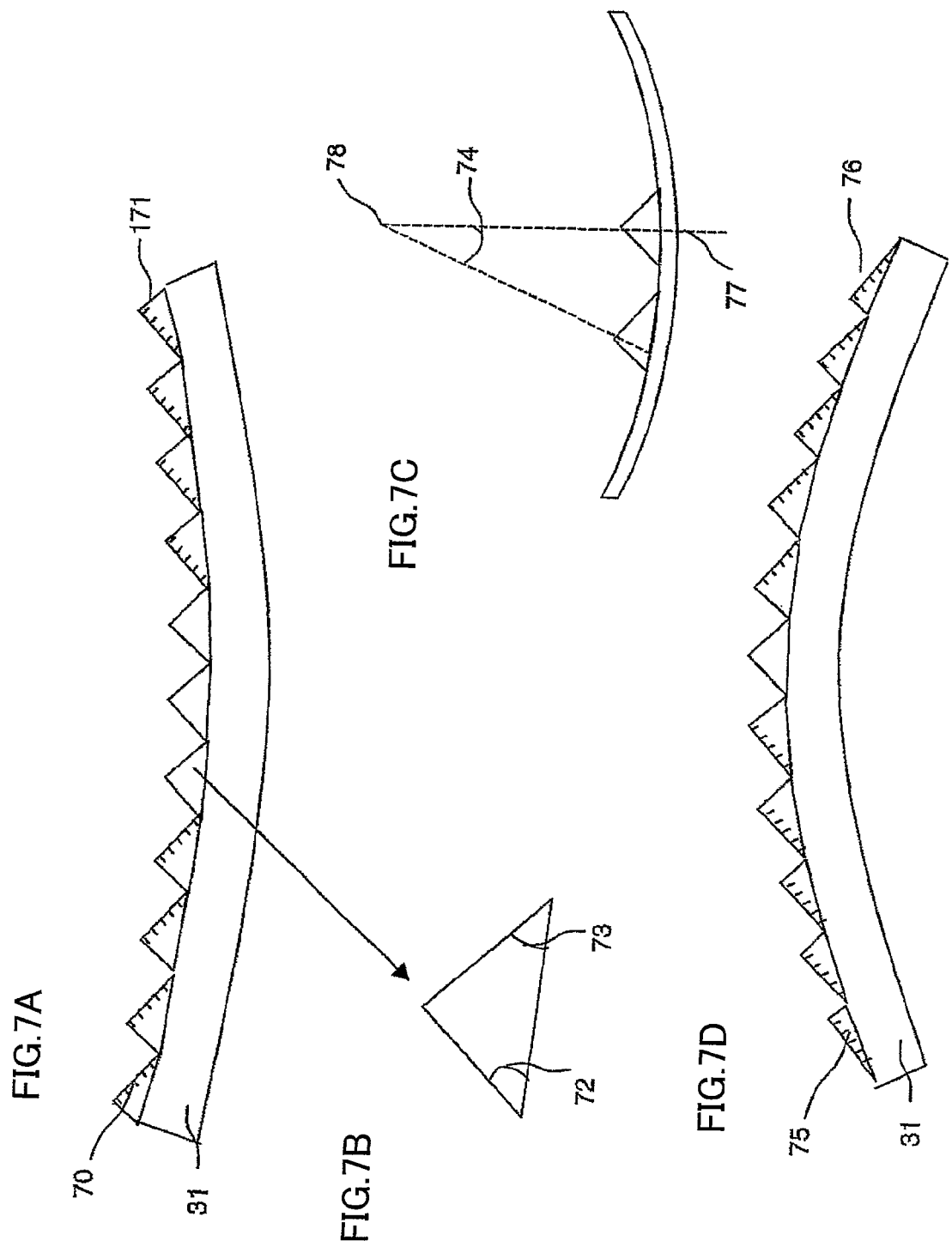

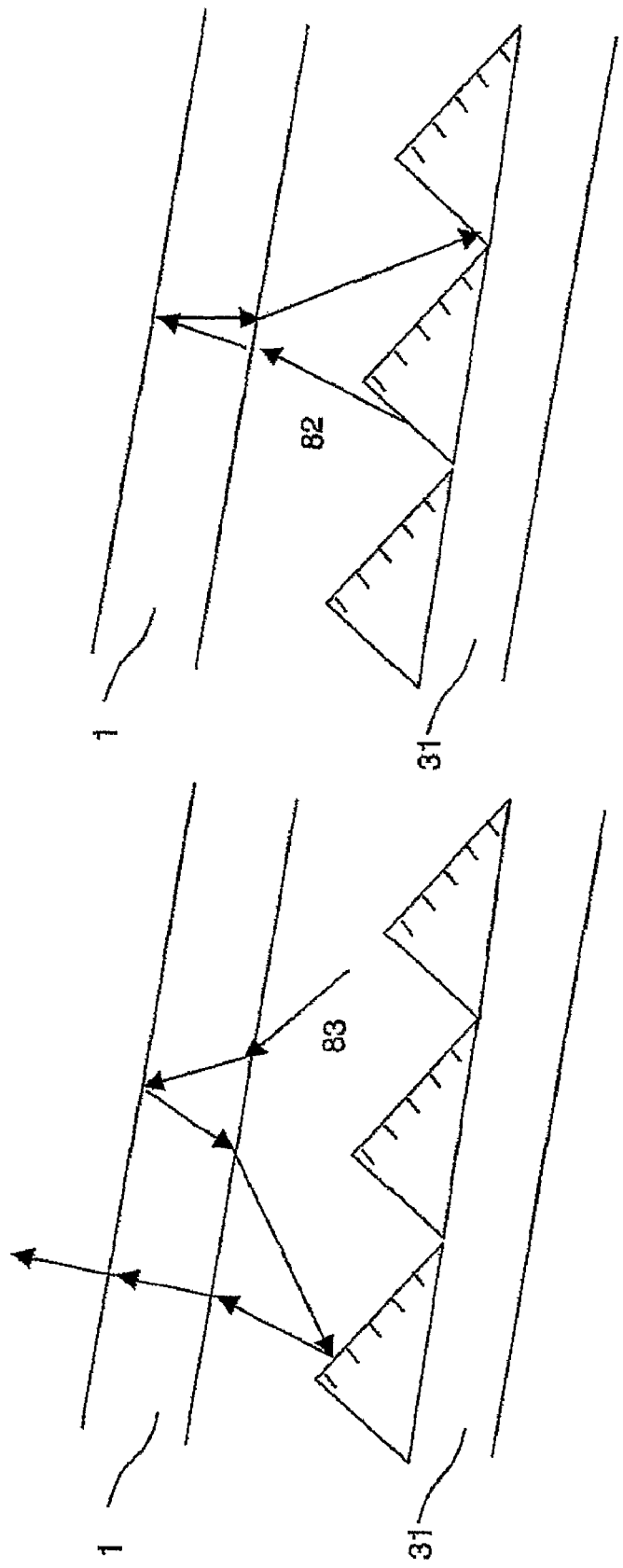

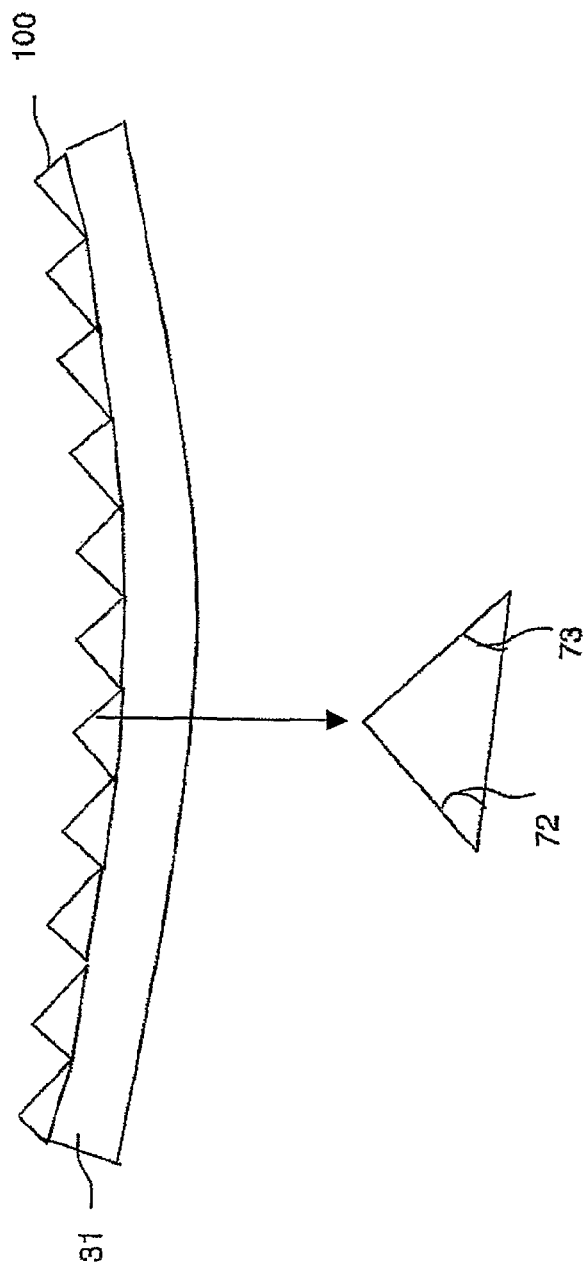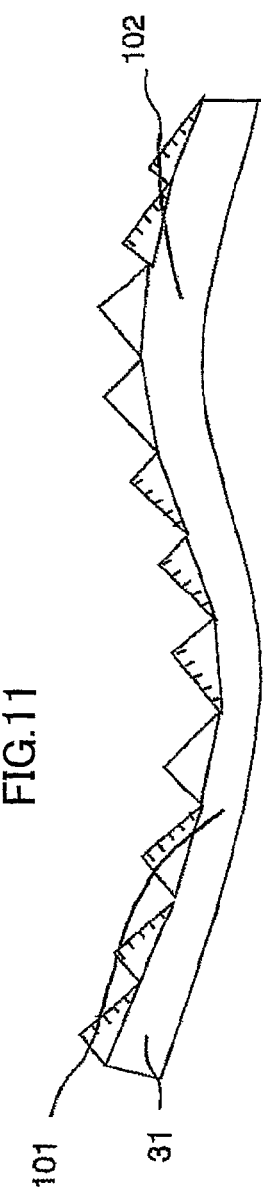

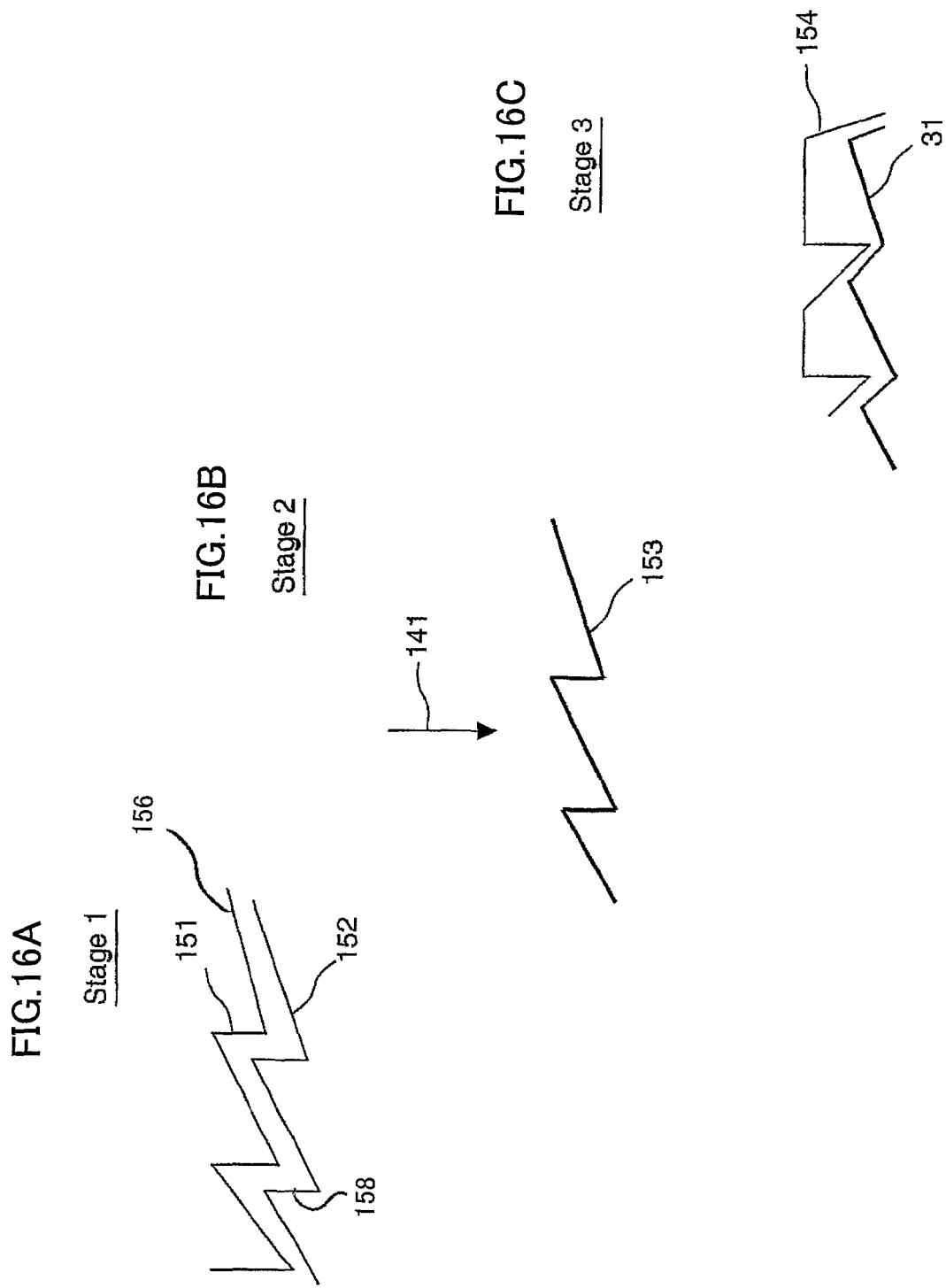

OPTICAL DEVICE, MATERIAL FOR FORMING OPTICAL DEVICE, BACKLIGHT FOR DISPLAY, DISPLAY AND METHOD OF MAKING DEVICE OR MATERIAL

TECHNICAL FIELD

The present invention relates to an optical device for concentrating light and to a material for forming into such an optical device. The present invention also relates to a backlight for a display including such a device and to a display including such a backlight or such a device. The present invention further relates to methods of making such a device and such a material.

BACKGROUND ART

The US patent U.S. Pat. No. 6,091,547 (3M, 2000) discloses the use of a prismatic film, which collects light from 'off-axis' and redirects this light 'on-axis' and which is known as a brightness enhancement film (BEF). A schematic of this film is shown in FIG. 1A of the accompanying drawings. Light produced by the source can be efficiently directed towards the viewer resulting in a brighter display. This film cannot be used efficiently with a curved backlight, as uniformity is not maintained when this film is curved. In particular, the direction of brightness enhancement becomes different when the film is curved. Typically BEFs are used as an orthogonal pair inside a backlight, in order to condense the light in both directions.

The Japanese patent JP 2004/288570 (Toshiba) discloses curved displays, where the distribution of the extraction features in the lightguide is modified to allow on axis uniformity, though it does not describe in detail the scatter points or their distribution.

The US patent U.S. Pat. No. 5,940,215 (Ericsson, 1998) discloses a flexible light-guide whereby microstructure is moulded onto the surface as a diffuser so that the emission from the light-guide is more even and broad. However, the display is relatively dim to an on-axis viewer.

The US patent U.S. Pat. No. 7,221,847 (3M) discloses a flat optical element, such as a lightguide or an optical film, which is formed with a predetermined, programmed pattern of optical structures. The optical structures may be arranged to selectively correct for non-uniformities in the output of a lightguide, or may be arranged to otherwise enhance the performance of a display.

The US patent U.S. Pat. No. 6,752,505 (Solid State Opto Limited) discloses light redirecting films, which include a pattern of individual optical elements of well defined shape on the light exit surface of the films for refracting the light entering the entrance surface of the films from a backlight toward a direction that is normal to the exit surface. The individual optical elements overlap and intersect each other. Also, the orientation, size and/or shape of the optical elements may be tailored to redirect more of the incident light from the flat backlight within a desired viewing angle. An example of such an arrangement is shown in FIG. 1B of the accompanying drawings.

The US patent application no. 2005/0024754 (3M) discloses a film where prism structures are metalized and reshaped in order to reflect incident light within a desired reflective light pattern. Such a film is designed to redirect light of a reflective flat display and an example is shown in FIG. 1C of the accompanying drawings.

The U.S. patent application Ser. No. 11/301995 discloses a micro-structured optical film used to enhance on-axis luminance and remove windscreen reflections in cars. Such a film is designed for a flat backlight.

The British patent application no. 2443849 discloses wedge shaped extraction features in the lightguide to correct direction in the curve from a curved lightguide.

FIG. 2 of the accompanying drawings illustrates a typical display of known type that is used in common Liquid Crystal Displays. The display is composed of a flat transmissive spatial light modulator (SLM) in the form of a liquid crystal display (LCD) panel 2 placed between polarizers 3 and 4. The panel is provided with a backlight 12, whose main components are diffusers 5 and 6, a pair of BEF's, 1, arranged in an orthogonal fashion to form horizontal and vertical BEF's, a light guide 8 with its extraction features 9 (exaggerated in this diagram), one or more illumination devices 10 and a rear reflector film 11. The light from the source is coupled into a light guide 8, in which total internal reflection (TIR) takes place so that the light would travel along the light guide until it reached the far end if there were no scattering structure in the light guide. However, within the light guide 8 there are many extraction features 9 that frustrate the TIR and couple the light out of the light guide to illuminate the LCD panel. The rear reflector film 11 under the light guide 8 increases the out-coupling efficiency. There are also some optical films between the light guide 8 and LCD panel 2. Diffusers 5, 6 and BEF's 1 are present to achieve better illumination uniformity and to increase the brightness within a certain viewing angle range.

Some other films (not shown), such as a DBEF, could also be applied to such a backlight.

FIG. 3 of the accompanying drawings shows the display of FIG. 2 curved and comprising a curved LCD, 13, and a backlight 14. The radius of curvature in this case is much less than the viewing distance of the display viewer.

When using a standard curved backlight as shown in FIG. 4A of the accompanying drawings, a shift in the angular distribution, 22, is seen along the backlight unit as shown in FIG. 4B of the accompanying drawings. This is because the angle at which the viewer sees a point on the display, 20, now varies relative to the local display normal, 21. As a result, a viewer looking at this backlight will see an apparently non-uniform backlight, 24, with brighter and dimmer parts as illustrated in FIG. 4C of the accompanying drawings.

BEF's condense the light in such a way as to enhance the light within a certain angular range but, when bent, the prism-like structures change direction along the curve as shown in FIG. 5 of the accompanying drawings. As the BEF enhances light along the local normal, 21, and not along the viewer direction, 20, the apparent brightness of the display will also be reduced over the flat case.

Three main ways have been followed in the past to solve this problem of non-uniformity.

One comprises changing the distribution of the extraction features 9. By changing this distribution, the total amount of light extracted by the lightguide becomes non-uniform. Nevertheless, with such a method, it is possible to make brighter some parts of the lightguide and dimmer some others, allowing a certain control of the uniformity within a predetermined direction but being non-uniform in the others. However, this does not address the fundamental problem of direction and the viewing freedom is limited in this type of display, especially at lower bend radii.

A second way comprising using a strong diffuser has been followed, giving a uniform backlight unit by spreading the light. This however does not enhance brightness in any particular direction and the display will appear dimmer than an existing flat display.

A third is by adapting the extraction features 9 to control the light output direction to maintain uniformity and viewing freedom. These methods entail designing a complete light-guide for each different curve. In addition, the extraction features may be difficult to manufacture.

DISCLOSURE OF THE INVENTION

According to a first aspect of the invention, there is provided an optical device for concentrating light in a first direction, comprising a sheet carrying a plurality of first light-concentrating elements, the sheet being non-flat in a first plane which is perpendicular to an axis such that each second plane, which contains the axis and which intersects the sheet, intersects the sheet at at least one substantially straight line which is substantially parallel to the axis, each of the first light-concentrating elements being substantially prismatic with first and second surfaces, which extend from the sheet and intersect at a substantially straight intersection line which is substantially parallel to the axis, and a third surface at the sheet facing an angle of intersection of the first and second surfaces, each of the first light-concentrating elements being arranged such that a third plane substantially parallel to the axis and the first direction and passing through the intersection line divides the third surface into two parts of substantially identical widths perpendicular to the axis.

According to a second aspect of the invention, there is provided a material for forming into an optical device for concentrating light in a first direction, comprising a sheet carrying a plurality of first light-concentrating elements, the sheet being arranged to be formed into a predefined shape which is non-flat in a first plane which is perpendicular to an axis such that each second plane, which contains the axis and which intersects the sheet, intersects the sheet at at least one substantially straight line which is substantially parallel to the axis, each of the first light-concentrating elements being substantially prismatic with first and second surfaces, which extend from the sheet and intersect at a substantially straight intersection line which is substantially parallel to the axis, and a third surface at the sheet facing an angle of intersection of the first and second surfaces, each of the first light-concentrating elements being arranged such that, when the sheet is formed into the predefined shape, a third plane substantially parallel to the axis and the first direction and passing through the intersection line divides the third surface into two parts of substantially identical widths perpendicular to the axis.

The first light-concentrating elements may extend substantially throughout the length of the sheet.

The sheet may carry a plurality of second light-concentrating elements for concentrating light in a second direction, each of the second light-concentrating elements being substantially prismatic with first and second surfaces, which extend from the sheet and intersect at a substantially straight intersection line which is substantially parallel to the axis, and a third surface at the sheet facing an angle of intersection of the first and second surfaces, each of the second light-concentrating elements being arranged such that a further third plane substantially parallel to the axis and the second direction passing through the intersection line divides the third surface into two parts of substantially identical widths. The first and second light-concentrating elements may alternate with each other in directions parallel and perpendicular to the axis.

The angle of intersection may be substantially equal to 90°.

The third surfaces may be of substantially identical widths.

The light-concentrating elements may be integral with the sheet.

One of the first and second surfaces of each of at least some of the light-concentrating elements may be at least partially reflective. The one of the first and second surfaces may be the wider thereof. The one of the first and second surfaces may be reflective away from the sheet. The one of the first and second surfaces may be reflective towards the sheet.

At least part of the sheet may have the shape of a part of a cylinder.

In the case of the second aspect of the invention, the sheet may be flat. The sheet may be bendable to form the predefined shape.

According to a third aspect of the invention, there is provided a backlight for a display, comprising a device according to the first aspect of the invention disposed in front of a light guide whose shape substantially conforms to that of the device.

The device may be disposed between the light guide and a further device for concentrating light and having a shape which substantially conforms to that of the device. The further device may comprise a one-dimensional array of prisms oriented substantially perpendicularly to the light-concentrating elements.

According to a fourth aspect of the invention, there is provided a display including a backlight according to the third aspect of the invention or a device according to the first aspect of the inventions.

The display may comprise a liquid crystal device.

According to a fifth aspect of the invention, there is provided a method of making a device according to the first aspect of the invention or a material according to the second aspect of the invention, comprising the steps of:
i) providing the sheet carrying the light-concentrating elements;
ii) covering a first part of the sheet with a shield, for preventing vapour metallisation of the covered first part, to leave a second part of the sheet uncovered;
iii) disposing the partially covered sheet relative to a metal vapour source such that ones to be metallised of the first and second surfaces of the second part of the sheet face the metal vapour source and others to be unmetallised of the first and second surfaces of the second part of the sheet are shaded from the metal vapour source;
iv) metallising the ones to be metallised of the first and second surfaces of the second part of the sheet by the metal vapour source.
v) covering the second part of the sheet with the shield for preventing further vapour metallisation of the second part;
vi) disposing the partially covered sheet relative to the metal vapour source such that ones to be metallised of the first and second surfaces of the first part of the sheet face the metal vapour source and others to be unmetallised of the first and second surfaces of the first part of the sheet are shaded from the metal vapour source; and
vii) metallising the ones to be metallised of the first and second surfaces of the first part of the sheet by the metal vapour source.

The step i) may include bending the sheet.

The step v) may comprise turning the sheet through 180 degrees.

The step i) may include forming the light-concentrating elements with blocking features at or adjacent the intersection lines. The method may comprise the step of substantially removing the blocking features after the step vii).

According to a sixth aspect of the invention, there is provided a method of making a device according to the first aspect of the invention or a material according to the second aspect of the invention, comprising the steps of:
  i) preparing a sheet to provide one of the first and second surfaces in one side of the sheet;
  ii) metallising the one side of the sheet; and
  iii) removing material from the one side of the sheet to provide the other of the first and second surfaces.

The step ii) may comprise metallising the one side of the sheet by a metal vapour source.

The step i) may comprise the step of forming in the sheet alternating inclined surfaces, including the one of the first and second surfaces and perpendicular surfaces which extend substantially perpendicularly with respect to the one side of the sheet before the forming step.

It is thus possible to provide an arrangement which enables the correction of direction of light so that central brightness, apparent uniformity and viewing freedom are maintained similar to that of a flat backlight, for example when the backlight is curved to a radius of curvature much less than the viewing distance. Existing light-guides and extraction features may be used and only a single sheet need be replaced for adapting to different curve shapes. It is not necessary to change the thickness of the backlight.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 3 shows a curved LCD of known type;

FIGS. 4A to 4C show the origin of non-uniformity of a curved backlight of known type;

FIGS. 7A to 7I show brightness enhancement films constituting embodiments of the invention for concave and convex backlights and details thereof;

FIGS. 9A and 9B show reflected and recycled rays after a first pass in the BEF's;

FIG. 10 shows a BEF without any partially or totally reflective, partially or totally transmissive interface;

FIG. 11 shows a BEF with multiple curves;

FIGS. 16A to 16C are diagrams illustrating steps in another method of making a BEF of the type shown in FIG. 7.

BEST MODE FOR CARRYING OUT THE INVENTION

Embodiment 1

Figure 1A:
FIGS. 1A to 1C show some prior art in this field.
Figure 1C:
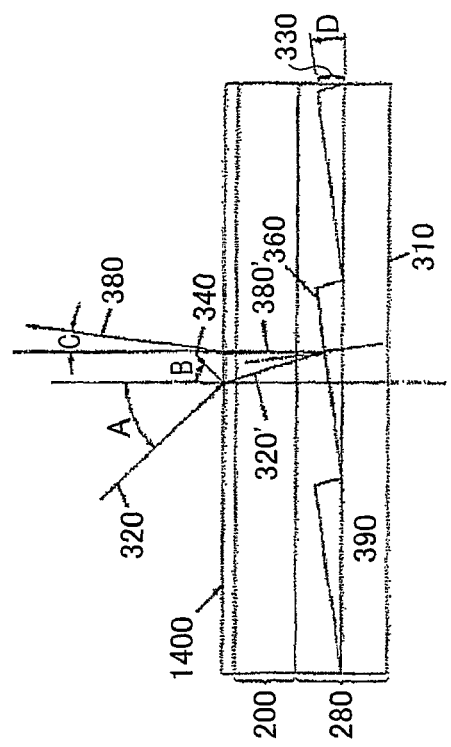
Figure 1B:
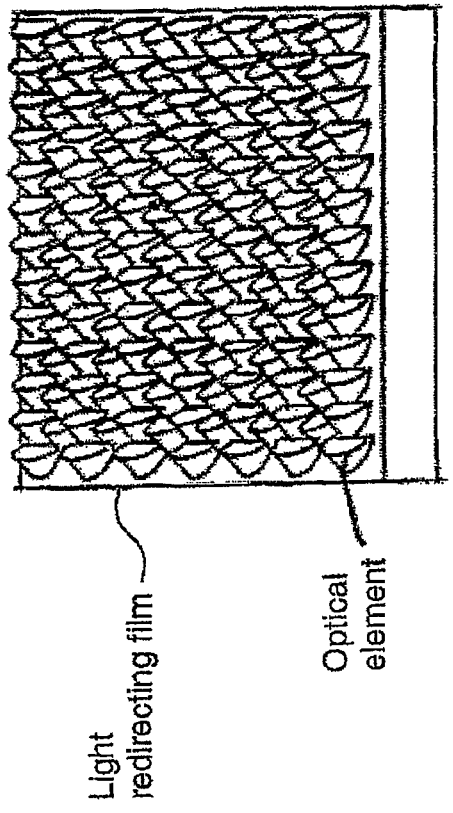
Figure 2:
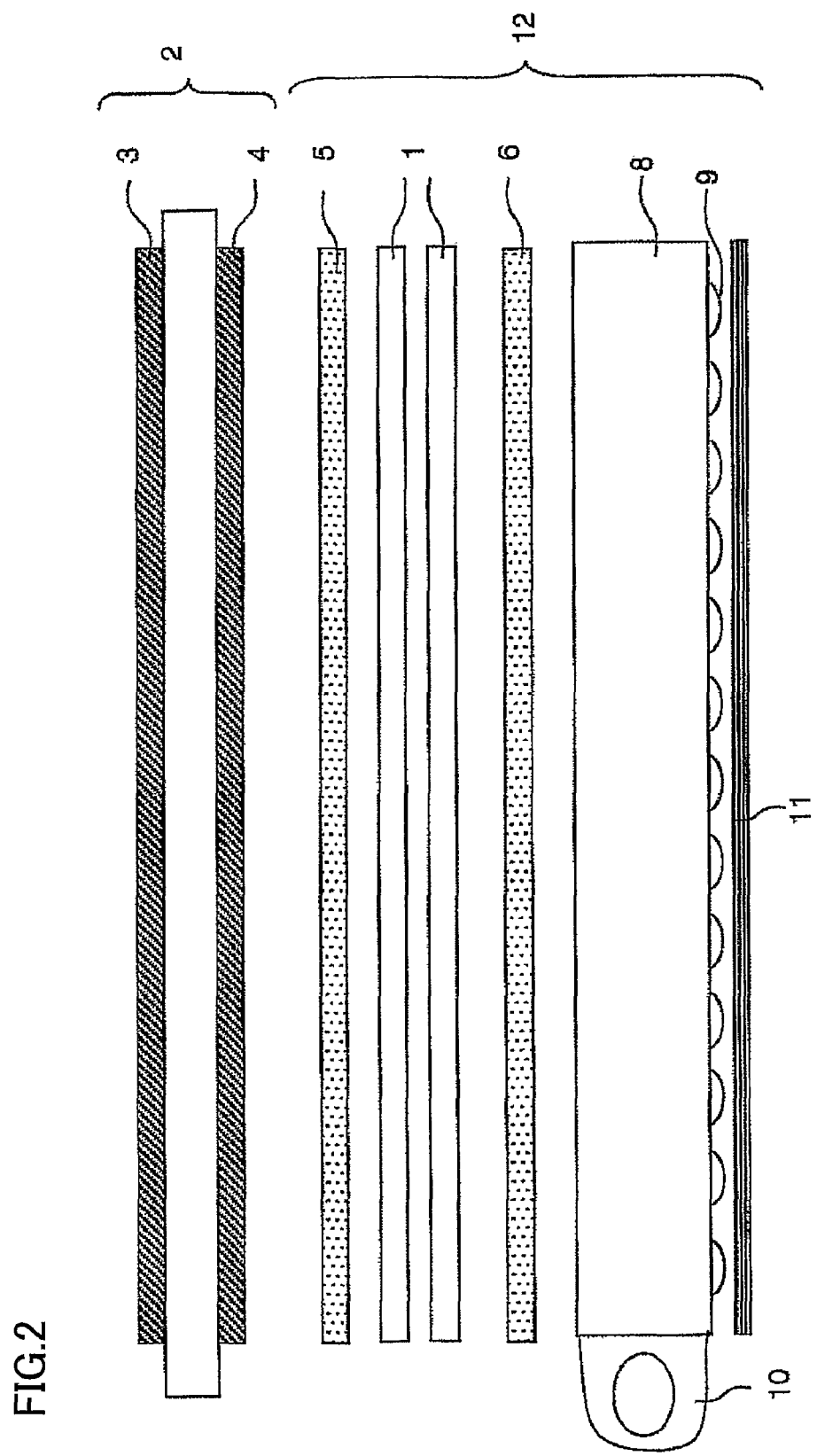
FIG. 2 shows a typical known backlight system liquid crystal display (LCD) module.
Figure 5:
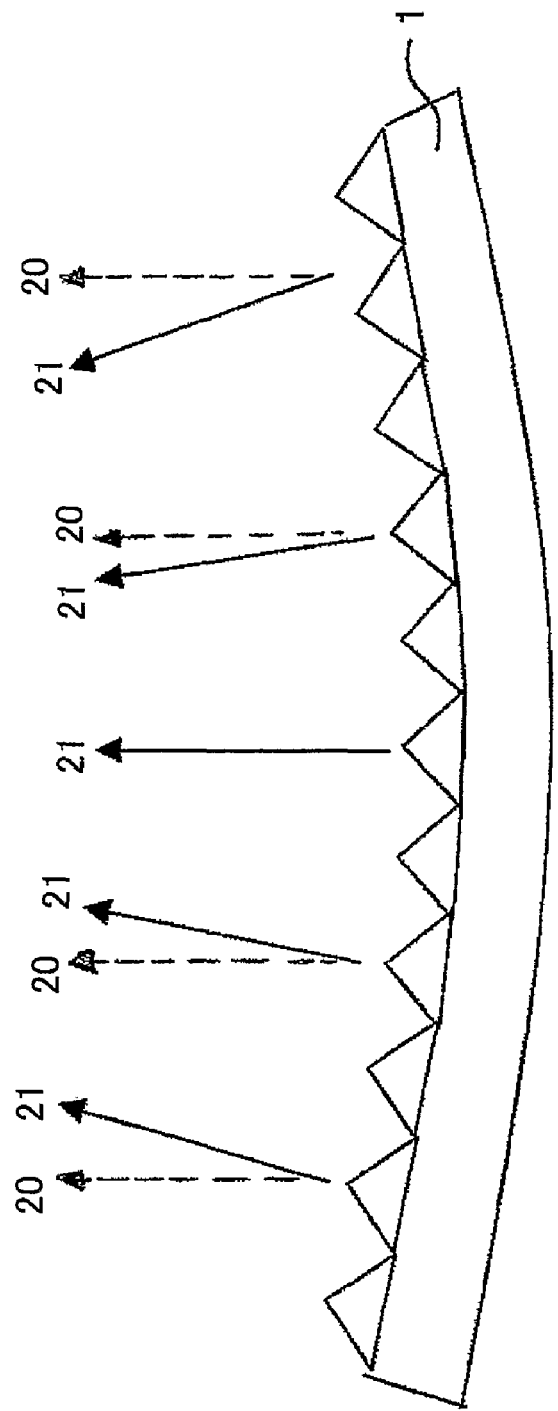
FIG. 5 shows a curved Brightness Enhancement Film (BEF) with exaggerated features.
Figure 6:
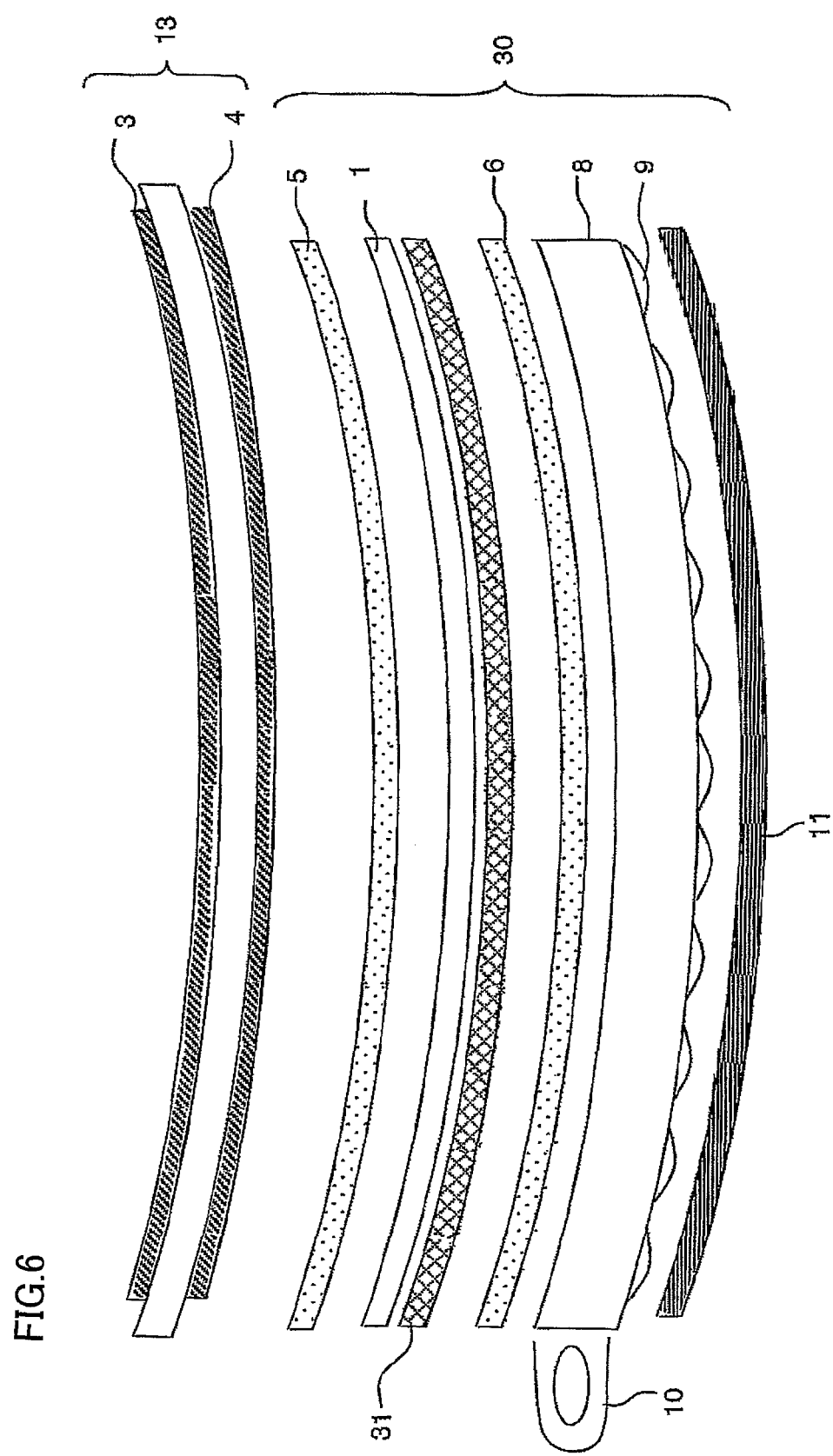
FIG. 6 shows a curved backlight system liquid crystal display where the typical known BEF is replaced by a layer constituting embodiment of the invention.

FIG. 6 illustrates a display, which differs primarily from that shown in FIG. 3 in that, in its backlight, 30, the standard horizontal stripe BEF 1 is replaced by a horizontal stripe BEF 31. The vertical BEF 1 is retained in this embodiment. The horizontal stripe BEF 31 is shown in FIG. 7A. This is composed of light-concentrating elements in the form of prism-like structures, 171, which extend substantially throughout the length of the film and which redirect off-axis light to enhance on-axis light. The film 31 is disposed in front of the lightguide 8, whose shape substantially conforms to that of the film, and between the lightguide 8 and the BEF 1, whose shape also substantially conforms to that of the film 31. The BEF 1 constitutes a one-dimensional array of prisms oriented substantially perpendicular to the prism-like structures 171.

The prism-like structures 171 vary along the film depending on the curve, maintaining the centre of extraction of the light parallel along the film.

FIG. 7B shows the angles 72 and 73 that (for a circular curve) vary linearly, relative to the radius of curvature and their position (e.g. the angle 74 subtended at the centre of curvature 78 relative to reference direction 77 in FIG. 7C), to maintain the centre of extraction of the light.

Such a film could be concave (FIG. 7A), or convex (FIG. 7D).

This layer is also composed of reflecting interfaces 75, 76 placed on one of the interfaces of the prism-like structure.

Figure 7E:
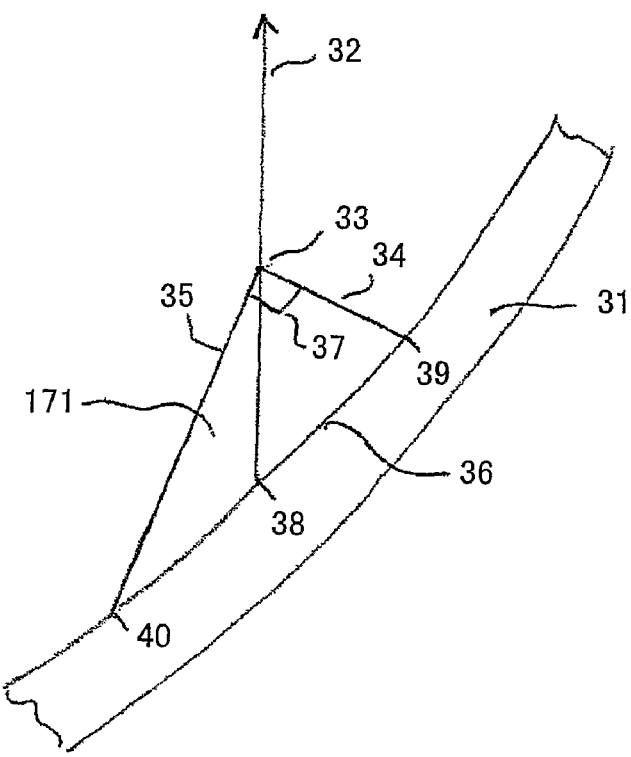
Figure 7F:
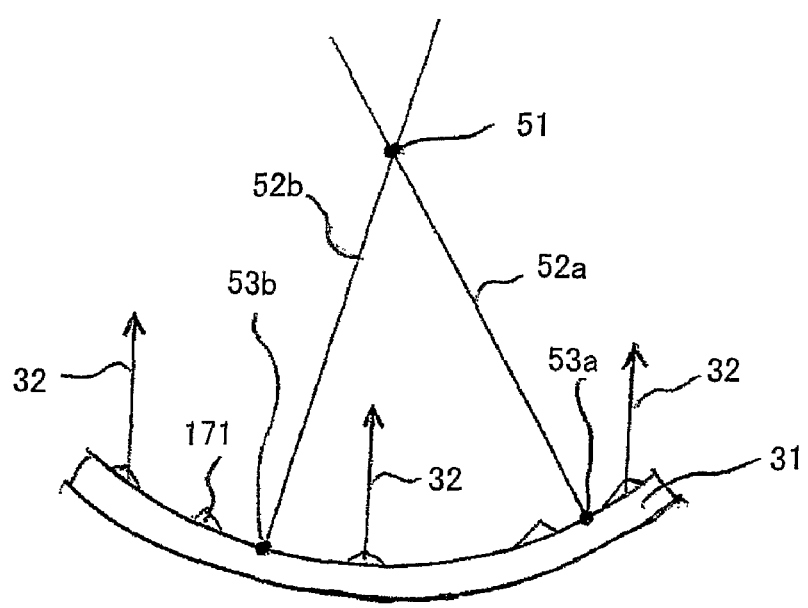

FIG. 7E illustrates in more detail a portion of the film 31 and one of the prism-like 171 in relation to the desired direction 32 of light output from the film 31. FIG. 7F illustrates the geometry of the film 31 of this embodiment.

The film 31 is curved or non-flat in a first plane, which is the plane of the drawings of FIGS. 6 to 13A and which is perpendicular to an axis 51. The axis 51 may be arbitrary for defining the geometry of the film 31. Alternatively, the axis 51 may be related to the geometry. For example, in embodiments where at least part of the film 31 has the shape of part of a cylinder, the axis 51 may be the axis of the cylinder.

The film 31 is curved in one dimension (in the first plane), such that each second plane (such as 52a and 52b), which contains the axis 51 and intersects the film 31, intersects the film 31 at a substantially straight line (such as 53a and 53b, respectively), which is substantially parallel to the axis 51. Each of the prism-like structures 171 is substantially prismatic in that it has identically shaped triangular end faces whose corresponding apices are connected together by lines, which are parallel to the axis 51 and with the end faces being perpendicular to the axis 51.

Each prism-like structure 171 comprises a first surface 34 and a second surface 35, which extend from the film 31 and meet at an intersection or apex line 33 to form an angle 37, which is substantially equal to 90°. The apex line 33 is substantially straight and substantially parallel to the axis 51. The prism-like structure 171 has a third surface 36 which faces the angle 37 and which, although curved, is close to being flat because the prism-like structures 171 are relatively small in comparison with the curvature of the film 31. In practice, the prism-like structures 171 may be formed integrally with the film 31 so that the surface 36 may not exist as a "physical" surface. However, it still exists as an at least notional surface and references to "the surface 36" are to be interpreted appropriately.

A third plane is substantially parallel to the axis 51 and to the (local) light output (first) direction 32. In this embodiment, the third plane contains the direction 32. The direction 32 thus represents a third plane which passes through the apex line 33 of the prism-like structure 171 and intersects the third surface 36 of the structure at a line 38, which is equally spaced from the lines 39 and 40 where the surfaces 34 and 35 intersect the film 31. The plane 32 thus divides the third surface 36 into two parts of substantially identical widths (perpendicular to the axis 51). This condition applies to all of the prism-like structures 171. In other words, considering only the plane of FIG. 7E, the light output direction 32 or display viewing direction, where it intersects the apex 33 of the triangular or substantially triangular cross-section of the prism-like structure 171, bisects the opposite side 36. This condition is sufficient for light from the lightguide to be concentrated, in the plane of FIG. 7E, in or about the viewing direction 32. In a typical application of such a film, the distance between the lines 39 and 40 is 20 to 30 micrometers.

Figure 7G:
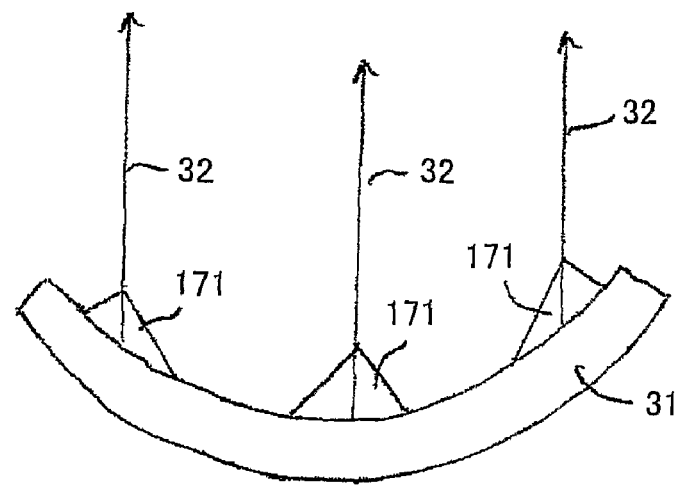
Figure 7H:
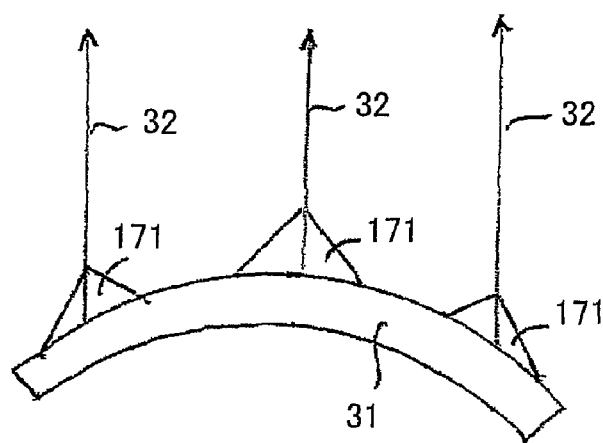

FIGS. 7G and 7H illustrate, to an exaggerated scale, this condition for concave and convex films 31 with the viewing direction being normal to the middle of the film and parallel thereto. The above-mentioned condition applies to all of the prism-like structures 171 with the light output or viewing directions 32 being substantially parallel to each other.

Figure 7I:
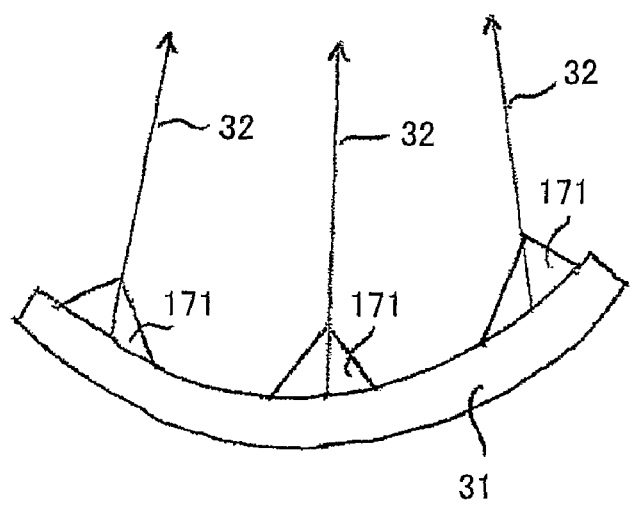

FIG. 7I illustrates a slightly more modified arrangement for the concave film 31 in which the display has an intended viewing distance and the viewing directions 32 converge to a point or line at this viewing distance. This viewing distance is further from the film 31 than the centre of curvature of the film. The condition whereby the direction 32 passing through the apex of each of the prism-like structures 171 bisects the opposing side or surface is maintained but for viewing directions 32 which vary across the film 31 so as to converge at the intended or designed viewing distance.

The prism-like structures 171 may all have the same opposing side 36 or width of surface at the film 31 with the angles 37 all being substantially equal to 90°. Although the prism-like structures 171 are illustrated with the surface 36 identified, in practice, the structures may be integral with the film 31 and may be formed from a single sheet of material, for example by moulding or stamping. The material may be manufactured in a flat state and may be subsequently bent or otherwise formed to the desired shape for the specific application. The prism-like structures 171 are made so that they meet the above-mentioned requirement when the material is formed to the predefined shape for the specific display for which it is intended.

Although the first and second surfaces 34 and 35 of each of the prism-like structures 171 may be light-transmissive, one of these surfaces may alternatively be reflective or partially reflective. Where a reflective or partially reflective layer is provided, this is on the wider of the first and second surfaces 34 and 35 at the specific location of the prism-like structure 171. The reflective or partially reflective surfaces may be formed by applying a coating and may be reflective away from the film 31 or both away from and towards the film 31.

Figure 8A:
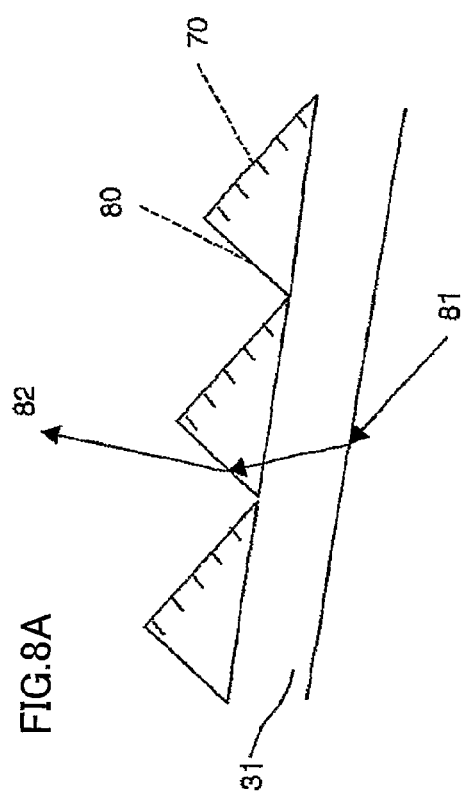
FIGS. 8A to 8C show refraction/reflection of the rays in the BEF's.
Figure 8C:
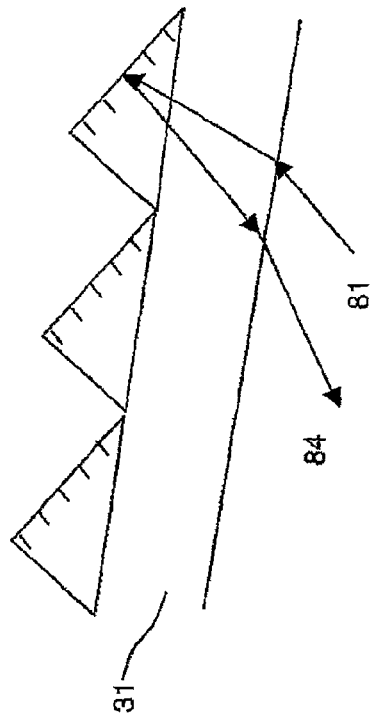
Figure 8B:
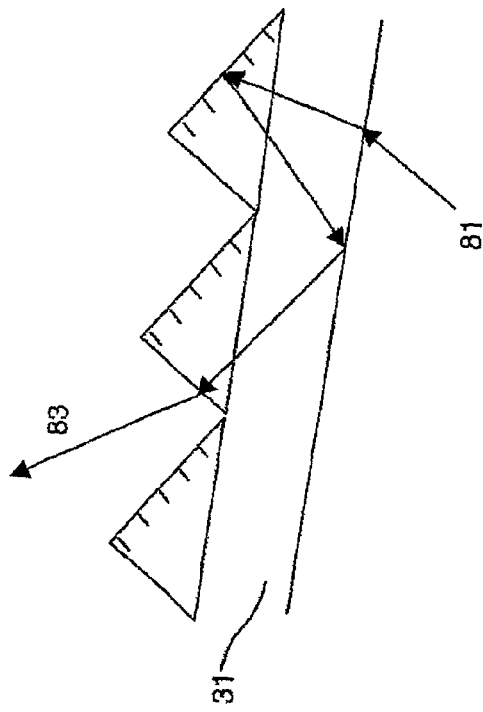

Within such an arrangement, light extraction from the lightguide, 8, is spread by the first diffuser, 6, and the light, 81, passes though the bottom interface of the layer, 31. This then hits the prism-like structure 171. Depending on whether or not this interface is mirrored, 70, or not, 80, the ray will be subject to the Snell-Descartes law as shown by refracted light, 82, if the interface is not mirrored (FIG. 8A). Reflected light, 83, by the mirrored interface, 70, could then be totally reflected by the bottom surface of this layer (FIG. 8B) or transmitted back to the lightguide, such as light, 84, to be recycled (FIG. 8C).

After being subject to reflection and/or refraction at the layer 31, the light will pass through the vertical stripe BEF 1, and will then be subject to its mechanism of horizontal condensing, having light passing through the prism-like interface, and rays reflected back. Those reflected rays may then be reflected by the layer, 31, with a different angle (FIG. 9A) or recycled (FIG. 9B).

These mechanisms provide a control of the light output, enhancing it within a certain range of angles and maintaining the uniformity.

Other embodiments are described below. Those embodiments are not limited to their own area, but could also be used or combined as variations and applied for a concave or convex backlight.

Embodiment 2

This embodiment is similar to the first embodiment, the mirrored interface being replaced by a partially reflective, partially transmissive interface allowing a degree of control of the light enhancement.

Embodiment 3

This embodiment comprises a simplified layer being reshaped as in the first embodiment but without any reflective, semi-reflective or semi-transmissive interface to the prism features, 100. This is illustrated in FIG. 10.

Embodiment 4

This embodiment is similar to the first embodiment, the BEF being redesigned for multiple curved displays as shown in FIG. 11 and having a concave portion 101 and a convex portion 102.

Embodiment 5

Figure 12:
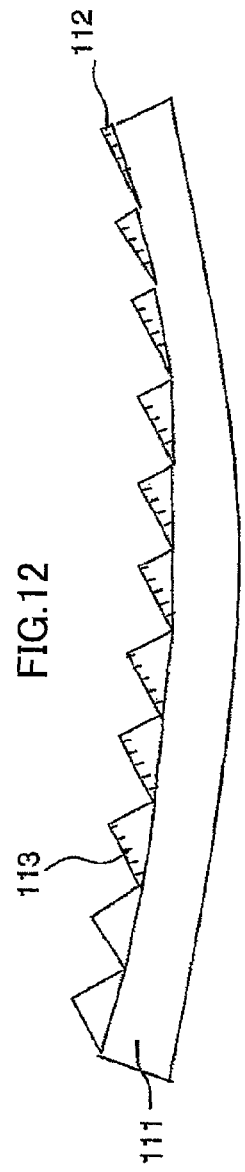
FIG. 12 shows a BEF for enhancing off-axis light.

This embodiment shown in FIG. 12, comprises a layer, 111, with a reshaped prism structure, 112, 113. The prism structures are designed so that the direction of light is enhanced in a direction that is not normal to the centre of symmetry of the display, and can be in any chosen direction.

Embodiment 6

Figure 13A:
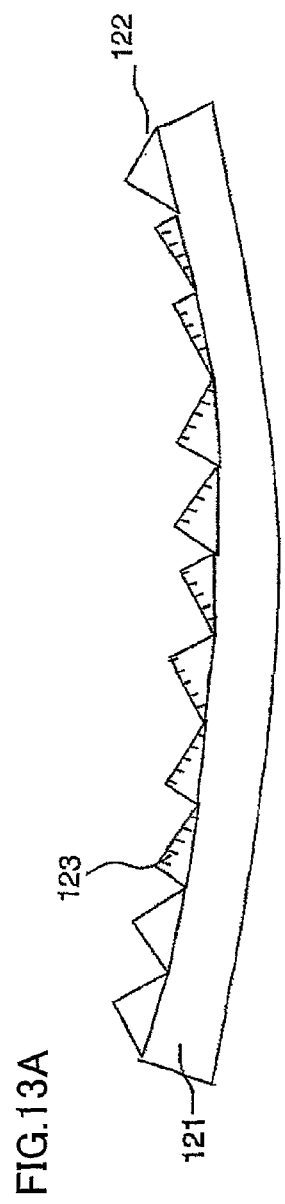
FIGS. 13A and 13B show a BEF designed to redirect light into two different directions.
Figure 13B:
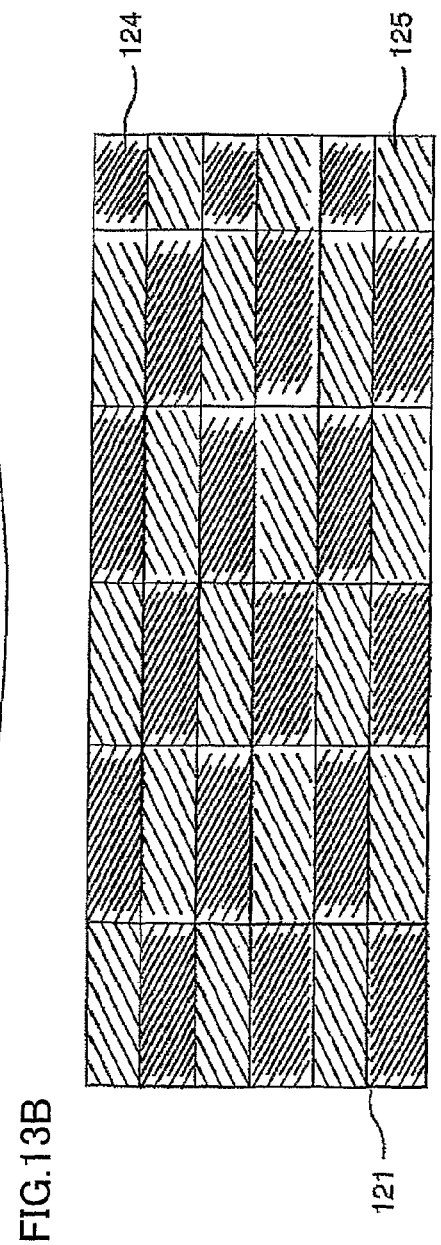

This embodiment comprises a layer, 121, enhancing the light emitted from the backlight in two different directions by reshaping the prism structure, 122, 123. This is illustrated in FIG. 13A. Prism structures are split into two groups, 124 and 125, depending on the direction of the emitted light, each according to embodiment 4. One group redirects the light within a first angle and the second group within a second angle. Those groups are mixed within an array such as shown in FIG. 13B so that the prism structures of the first and second groups alternate with each other in directions parallel and perpendicular to the axis 51 (vertically and horizontally, respectively, in FIG. 13B).

Embodiment 7

Figure 14:
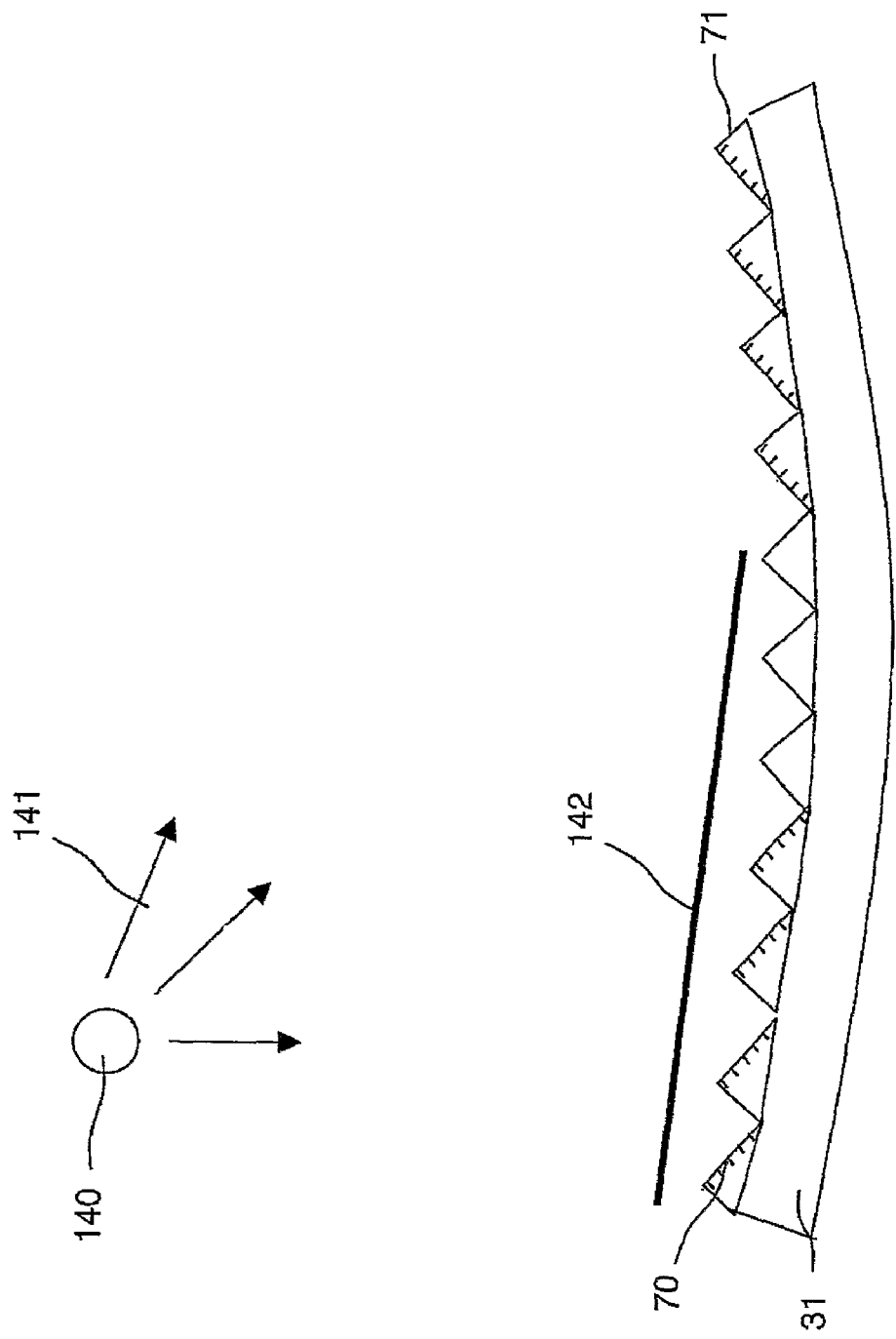
FIG. 14 is a diagram illustrating a step in a method of making a BEF of the type shown in FIG. 7.

FIG. 14 illustrates a step in a method for the manufacture of the sheet 31. The prism structure forming the light-concentrating elements is cut into a plastic (e.g. PET or "polyethylene terephthalate") sheet using known techniques, such as nano-imprinting or drum diamond cutting. The thus-provided sheet is then supplied to a metallisation process as shown in FIG. 14. The sheet 31 is positioned in an evaporator under vacuum with a metal vapour source 140 emitting vapour 141 in a directed manner, for example as a vapour beam. The sheet 31 is curved in a circular mould at a radius of curvature dependent on the final or intended radius of curvature and the distance of the metal vapour source from the sheet. For example, for a source at substantially the same distance from the sheet as the designed viewing distance, the radius of curvature during the metallisation step may be the same as the intended radius of curvature. The radius of curvature may be adjusted or varied from the nominal value to compensate for a finite size source, for example to avoid or reduce metallisation of non-reflective surfaces.

A first part such as half of the sheet is covered with a shield 142. The position is such that the sides which are to be metallised to form the mirrored interface 70 are exposed fully to the metal vapour source and the non-metallised sides 71 are in shadow. The vapour beam 141 irradiates the maximum area of the mirrored interface 70 while substantially not layering metal on the non-metallised sides 71. The process is repeated for the side under cover by turning the sheet by 180 degrees.

Embodiment 8

Figure 15A:
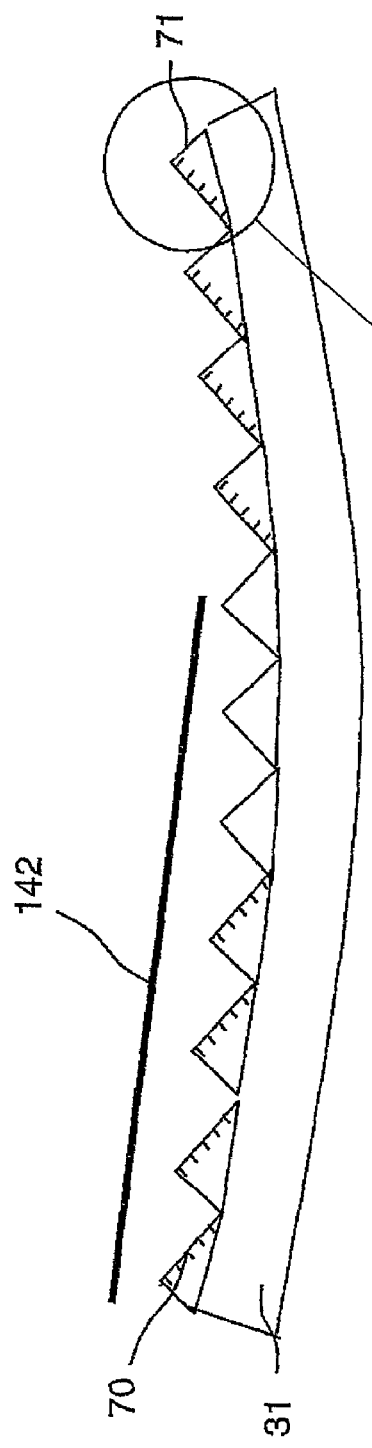
FIG. 15A is a diagram similar to FIG. 14 illustrating a modified step.
Figure 15B:
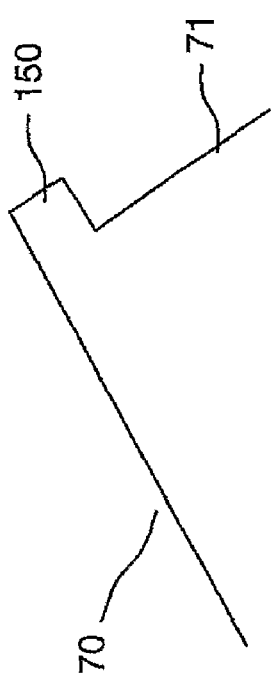
FIG. 15B shows a detail of FIG. 15A to an enlarged scale.

One potential issue with embodiment 7 is that there may be some metallisation of the non-metal areas due to misalignment or a finite size of the source (as mentioned above). A technique for reducing or preventing this is shown in FIGS. 15A and 15B and comprises adding 'blocking' features 150 to the apexes of the sheet features at or adjacent the intersection lines where the mirrored interfaces 70 and the non-metallised sides 71 intersect. These features improve the shadowing on the non-metallised side 71 and so reduce metallisation of this side. The size of the features 150 needs to be controlled as it will also reduce the area of the mirrored interface 70 that is covered with metal. The features 150 may be removed by a further cutting or lapping process after the metallisation process.

Embodiment 9

Another potential issue with embodiment 7 is that there is some metallisation of the non-metal areas due to the above issue and also to non-directed metal vapour. FIGS. 16A to 16C show an improved manufacturing method involving a three stage cut.

In stage 1 (FIG. 16A), a sheet is prepared by using a tool 156 to cut the sheet 152. The tool has only sloped sides that make a copy of the sides 70 to be metallised on the sheet. The tool has vertical sides 151 and does not cut the non-metal sides during stage 1 but instead forms surfaces 158 which extend substantially perpendicularly with respect to the side of the sheet before cutting and which alternate with sloped sides.

In stage 2 (FIG. 16B), the whole surface 153 is coated in metal by the vapour beam 141. Shielding or curving the sheet is not necessary. In stage 3 (FIG. 16C), the non-metallised sides 71 are cut from the sheet using a different tool 154 to remove material from that side of the sheet. These surfaces then have no metal layer.

Display brightness may be improved by improving the accuracy of making the reflective surfaces, for example as described above, and/or by improving the reflectivity of the reflective surfaces. For example, the reflective surfaces may be formed of an interference filter or an enhanced specular reflector or ESR film available from the 3M Corporation.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. An optical device for concentrating light in a first direction, comprising a sheet carrying a plurality of first light-concentrating elements, the sheet being non-flat in a first plane which is perpendicular to an axis such that each second plane, which contains the axis and which intersects the sheet, intersects the sheet at at least one substantially straight line which is substantially parallel to the axis, each of the first light-concentrating elements being substantially prismatic with first and second surfaces, which extend from the sheet and intersect at a substantially straight intersection line which is substantially parallel to the axis, and a third surface at the sheet facing an angle of intersection of the first and second surfaces, each of the first light-concentrating elements being arranged such that a third plane substantially parallel to the axis and the first direction and passing through the intersection line divides the third surface into two parts of substantially identical widths perpendicular to the axis.

2. A device as claimed in claim 1, in which the first light-concentrating elements extend substantially throughout the length of the sheet.

3. A device as claimed in claim 1, in which the sheet carries a plurality of second light-concentrating elements for concentrating light in a second direction, each of the second light-concentrating elements being substantially prismatic with first and second surfaces, which extend from the sheet and intersect at a substantially straight intersection line which is substantially parallel to the axis, and a third surface at the sheet facing an angle of intersection of the first and second surfaces, each of the second light-concentrating elements being arranged such that a further third plane substantially parallel to the axis and the second direction passing through the intersection line divides the third surface into two parts of substantially identical widths.

4. A device as claimed in claim 3, in which the first and second light-concentrating elements alternate with each other in directions parallel and perpendicular to the axis.

5. A device as claimed in claim 1, in which the angle of intersection is substantially equal to 90°.

6. A device as claimed in claim 1, in which the third surfaces are of substantially identical widths.

7. A device as claimed in claim 1, in which the light-concentrating elements are integral with the sheet.

8. A device as claimed in claim 1, in which one of the first and second surfaces of each of at least some of the light-concentrating elements is at least partially reflective.

9. A device as claimed in claim 8, in which the one of the first and second surfaces is the wider thereof.

10. A device as claimed in claim 8, in which the one of the first and second surfaces is reflective away from the sheet.

11. A device as claimed in claim 8, in which the one of the first and second surfaces is reflective towards the sheet.

12. A device as claimed in claim 1, in which at least part of the sheet has the shape of a part of a cylinder.

13. A material for forming into an optical device for concentrating light in a first direction, comprising a sheet carrying a plurality of first light-concentrating elements, the sheet being arranged to be formed into a predefined shape which is non-flat in a first plane which is perpendicular to an axis such that each second plane, which contains the axis and which intersects the sheet, intersects the sheet at at least one substantially straight line which is substantially parallel to the axis, each of the first light-concentrating elements being substantially prismatic with first and second surfaces, which extend from the sheet and intersect at a substantially straight intersection line which is substantially parallel to the axis, and a third surface at the sheet facing an angle of intersection of the first and second surfaces, each of the first light-concentrating elements being arranged such that, when the sheet is formed into the predefined shape, a third plane substantially parallel to the axis and the first direction and passing through the intersection line divides the third surface into two parts of substantially identical widths perpendicular to the axis.

14. A material as claimed in claim 13, in which the first light-concentrating elements extend substantially throughout the length of the sheet.

15. A material as claimed in claim 13, in which the sheet carries a plurality of second light-concentrating elements for concentrating light in a second direction, each of the second light-concentrating elements being substantially prismatic with first and second surfaces, which extend from the sheet and intersect at a substantially straight intersection line which is substantially parallel to the axis, and a third surface at the sheet facing an angle of intersection of the first and second surfaces, each of the second light-concentrating elements being arranged such that, when the sheet is formed into the predefined shape, a further third plane substantially parallel to the axis and the second direction passing through the intersection line divides the third surface into two parts of substantially identical widths.

16. A material as claimed in claim 15, in which the first and second light-concentrating elements alternate with each other in directions parallel and perpendicular to the axis.

17. A material as claimed in claim 13, in which the angle of intersection is substantially equal to 90°.

18. A material as claimed in claim 13, in which the third surfaces are of substantially identical widths.

19. A material as claimed in claim 13, in which the light-concentrating elements are integral with the sheet.

20. A material as claimed in claim 13, in which one of the first and second surfaces of each of at least some of the light-concentrating elements is at least partially reflective.

21. A material as claimed in claim 20, in which the one of the first and second surfaces is the wider thereof.

22. A material as claimed in claim 20, in which the one of first and second surfaces is reflective away from the sheet.

23. A material as claimed in claim 20, in which the one of the first and second surfaces is reflective towards the sheet.

24. A material as claimed in claim 13, in which the sheet is flat.

25. A material as claimed in claim 13, in which the sheet is bendable to form the predefined shape.

26. A backlight for a display, comprising a device as claimed in claim 1 disposed in front of a light guide whose shape substantially conforms to that of the device.

27. A backlight as claimed in claim 26, in which the device is disposed between the light guide and a further device for concentrating light and having a shape which substantially conforms to that of the device.

28. A backlight as claimed in claim 27, in which the further device comprises a one-dimensional array of prisms oriented substantially perpendicularly to the light-concentrating elements.

29. A display including a backlight as claimed in claim 26.

30. A display as claimed in claim 29, comprising a liquid crystal device.

31. A method of making a device as claimed in claim 1, comprising the steps of:
   i) providing the sheet carrying the light-concentrating elements;
   ii) covering a first part of the sheet with a shield, for preventing vapour metallisation of the first covered part, to leave a second part of the sheet uncovered;
   iii) disposing the partially covered sheet relative to a metal vapour source such that ones to be metallised of the first and second surfaces of the second part of the sheet face the metal vapour source and others to be unmetallised of the first and second surfaces of the second part of the sheet are shaded from the metal vapour source;
   iv) metallising the ones to be metallised of the first and second surfaces of the second part of the sheet by the metal vapour source;
   v) covering the second part of the sheet with the shield for preventing further vapour metallisation of the second part;
   vi) disposing the partially covered sheet relative to the metal vapour source such that ones to be metallised of the first and second surfaces of the first part of the sheet face the metal vapour source and others to be unmetallised of the first and second surfaces of the first part of the sheet are shaded from the metal vapour source; and
   vii) metallising the ones to be metallised of the first and second surfaces of the first part of the sheet by the metal vapour source.

32. A method as claimed in claim 31, in which the step i) includes bending the sheet.

33. A method as claimed in claim 31, in which the step v) comprises turning the sheet through 180 degrees.

34. A method as claimed in claim 31, in which the step i) includes forming the light-concentrating elements with blocking features at or adjacent the intersection lines.

35. A method as claimed in claim 34, comprising the step of substantially removing the blocking features after the step vii).

36. A method of making a device as claimed in claim 1, comprising the steps of:
   i) preparing a sheet to provide one of the first and second surfaces in one side of the sheet;
   ii) metallising the one side of the sheet; and
   iii) removing material from the one side of the sheet to provide the other of the first and second surfaces.

37. A method as claimed in claim 36, in which the step ii) comprises metallising the one side of the sheet by a metal vapour source.

38. A method as claimed in claim 36, in which the step i) comprises the step of forming in the sheet alternating inclined surfaces, including the one of the first and second surfaces, and perpendicular surfaces which extend substantially perpendicularly with respect to the one side of the sheet before the forming step.

39. A display including a device as claimed in claim 1.

40. A display as claimed in claim 39, comprising a liquid crystal device.

41. A method of making a material as claimed in claim 13, comprising the steps of:
   i) providing the sheet carrying the light-concentrating elements;
   ii) covering a first part of the sheet with a shield, for preventing vapour metallisation of the first covered part, to leave a second part of the sheet uncovered;
   iii) disposing the partially covered sheet relative to a metal vapour source such that ones to be metallised of the first and second surfaces of the second part of the sheet face the metal vapour source and others to be unmetallised of the first and second surfaces of the second part of the sheet are shaded from the metal vapour source;
   iv) metallising the ones to be metallised of the first and second surfaces of the second part of the sheet by the metal vapour source;
   v) covering the second part of the sheet with the shield for preventing further vapour metallisation of the second part;
   vi) disposing the partially covered sheet relative to the metal vapour source such that ones to be metallised of the first and second surfaces of the first part of the sheet face the metal vapour source and others to be unmetallised of the first and second surfaces of the first part of the sheet are shaded from the metal vapour source; and vii) metallising the ones to be metallised of the first and second surfaces of the first part of the sheet by the metal vapour source.

42. A method as claimed in claim 41, in which the step i) includes bending the sheet.

43. A method as claimed in claim 41, in which the step v) comprises turning the sheet through 180 degrees.

44. A method as claimed in claim 41, in which the step i) includes forming the light-concentrating elements with blocking features at or adjacent the intersection lines.

45. A method as claimed in claim 44, comprising the step of substantially removing the blocking features after the step vii).

46. A method of making a material as claimed in claim 13, comprising the steps of:

i) preparing a sheet to provide one of the first and second surfaces in one side of the sheet;

ii) metallising the one side of the sheet; and iii) removing material from the one side of the sheet to provide the other of the first and second surfaces.

47. A method as claimed in claim 46, in which the step ii) comprises metallising the one side of the sheet by a metal vapour source.

48. A method as claimed in claim 46, in which the step i) comprises the step of forming in the sheet alternating inclined surfaces, including the one of the first and second surfaces, and perpendicular surfaces which extend substantially perpendicularly with respect to the one side of the sheet before the forming step.

* * * * *